Figure 1:
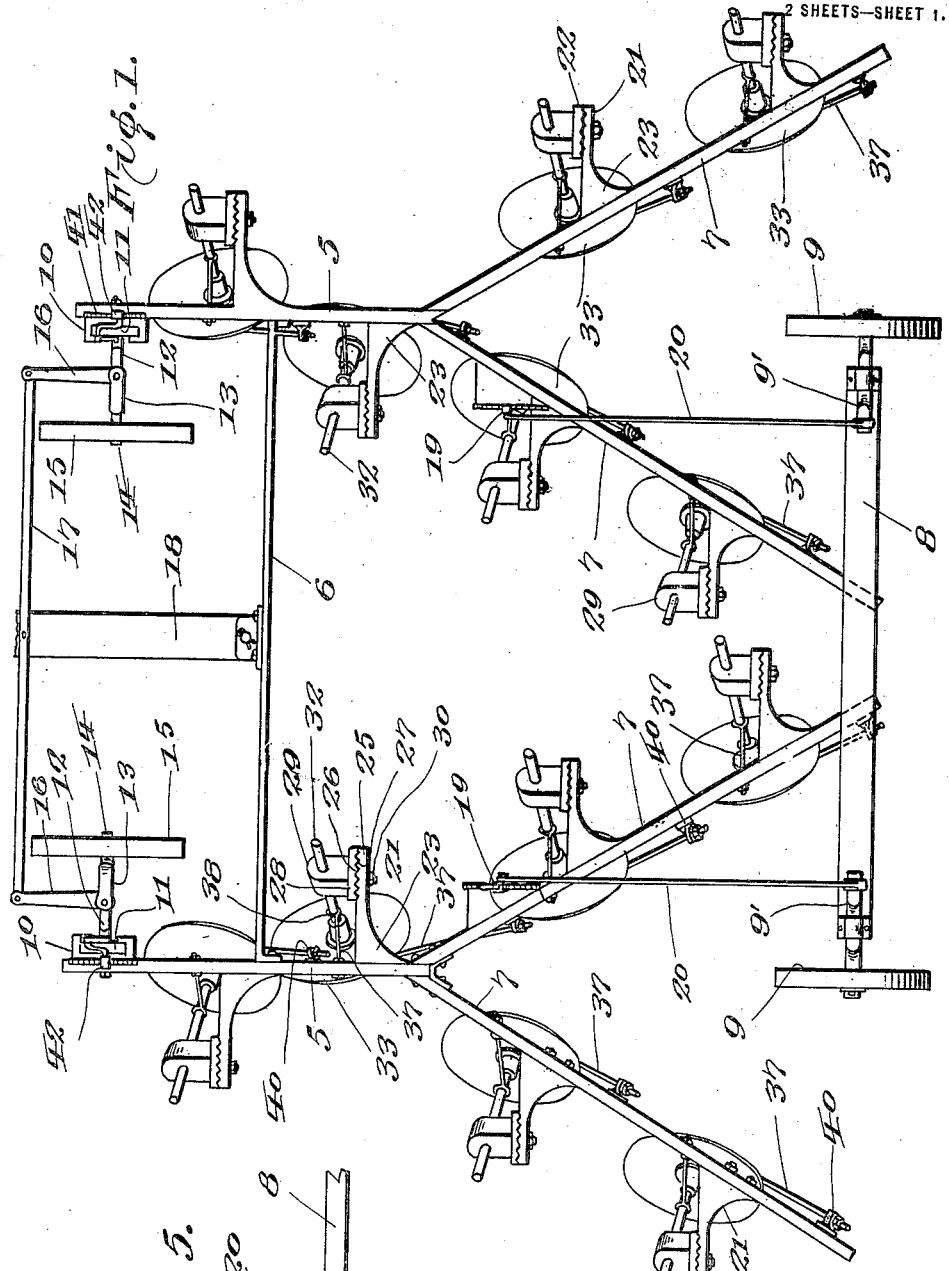

W. W. WHITE.
PLOW OR CULTIVATOR.
APPLICATION FILED OCT. 17, 1921.

1,430,608.

Patented Oct. 3, 1922.
2 SHEETS—SHEET 2.

Inventor:
W. W. White.

By [signature]
Attorneys.

Patented Oct. 3, 1922.

1,430,608

UNITED STATES PATENT OFFICE.

WILLIAM W. WHITE, OF KOLIN, MONTANA.

PLOW OR CULTIVATOR.

Application filed October 17, 1921. Serial No. 508,135.

*To all whom it may concern:*

Be it known that I, WILLIAM W. WHITE, a citizen of the United States, residing at Kolin, in the county of Judith Basin, State of Montana, have invented certain new and useful Improvements in Plows or Cultivators; and I do hereby declare the following to be a full, clear, and exact description of the invention, such as will enable others skilled in the art to which it appertains to make and use the same.

This invention relates to plow or cultivator structures, particularly to implements employing rotary cutters, and aims primarily to provide means of a simplified and improved nature whereby the cutters may be securely attached to the cultivator frame and so held during operation; the construction permitting of various adjustments of the cutters so that the angularity or inclination of the same relative to the ground may be varied.

A further object of the invention is to provide means whereby circular cutters in any desired number may be arranged upon the cultivator frame, and the said cutters or blades disposed either in a common angle or inclination or at various angles, according as conditions may require.

Still further objects reside in an improved mounting for the cutters, improved means for securing the disk shaft in angular position, and improved staying means for the cutters.

These objects, as well as others which will appear as the description proceeds, are accomplished by means of the preferred practical example of cultivator mounting illustrated in the accompanying drawings and described in the annexed specification, but it will be understood that variations in the construction, details and arrangements of parts may be resorted to without departing from the invention as defined by the claims.

Figure 2:
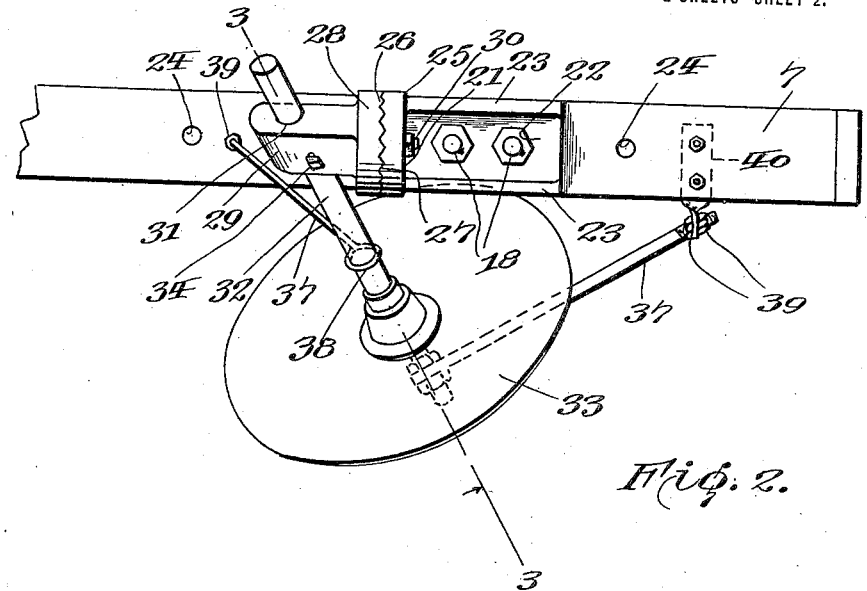
Figure 3:
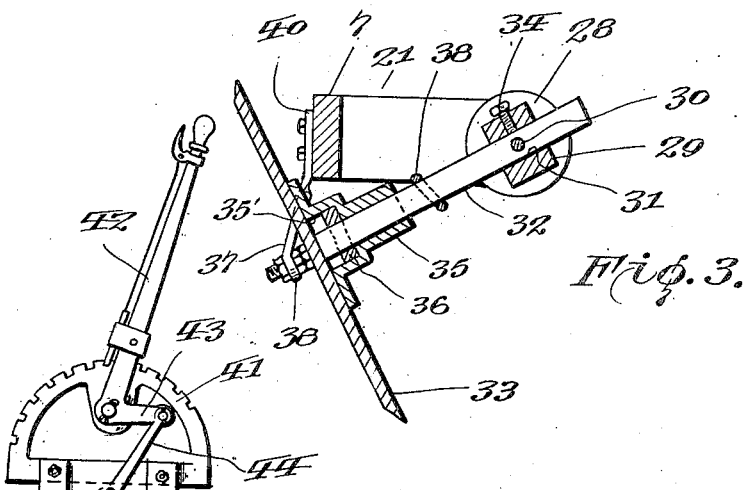
Figure 4:
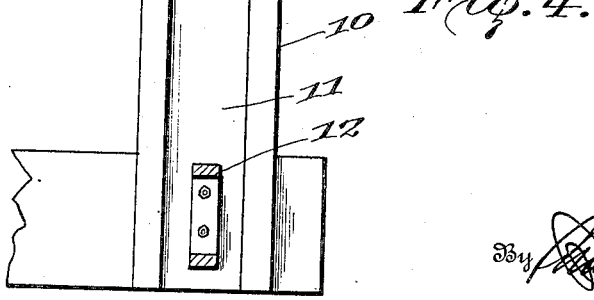

In the drawings:

Figure 1 is a plan view of a cultivator of conventional construction, showing the use of circular cutters in the manner contemplated by the invention, Figure 2 is a fragmentary side view of one of the frame bars with a cutter attached, Figure 3 is a sectional view through a supporting bracket and block, on the line 3—3 of Figure 2, Figure 4 is an elevation of the raising and lowering means of the ground wheels, and Figure 5 is a rear elevation of a portion of the machine showing one of the rear wheel supports.

The cultivator illustrated in the accompanying drawings comprises two parallel longitudinal or side bars 5, connected adjacent their forward ends by the cross bar 6, and having at their rear ends the divergent bars 7. The rear ends of the innermost of the divergent bars rest upon the lateral member 8, on which the rear draft wheels 9 are mounted by means of the crank axles 9'. Mounted on the inner face at the forward end of each of the side members 5 is a vertical channelled support 10, and slidable vertically in each member 10 is a plate or bar 11. Secured to each bar 11 is a right angularly extending bracket 12 on which is pivotally mounted the knuckle 13. This knuckle carries the stub axle 14, which rotatably supports the ground engaging steering wheels 15. Extending forwardly from each knuckle is an arm 16, and extending transversely of the machine, and pivotally connected at its ends to the arms 16, is the steering rod 17. The intermediate portion of the rod 17 is pivotally connected to the draft tongue 18, which tongue is pivotally secured to the bar 6. As the draft tongue is swung from side to side, the rod 17 will be moved to steer the wheels 15. Draft animals or a tractor may be attached to the draft tongue 18. Mounted on each of the inner bars 7 is an adjusting lever 19, and connected to each lever, and to a crank axle 9' is a link 20, by means of which the frame of the machine may be raised and lowered to regulate the digging depth of the ground treating elements to be explained later herein.

The frame of the cultivator supports the rotary cutters in the manner hereafter described, and as a description of one mounting will suffice for all, the detailed description of only one of the mountings will be given.

The support consists primarily in a bracket indicated at 21, the same being preferably formed of relatively thin metal straight throughout its entire length, having a right angularly disposed foot 22 at one end which is adapted to rest upon the flat faces of the frame bars of the cultivator. The bracket is also preferably provided with reinforcing webs 23, arranged at the longitudinal edges of the bracket and connecting the foot with the body portion thereof. The foot is provided with an opening adapted to align with any of the openings 24, arranged at intervals throughout the length of the longitudinal bars 5 of the frame, as well as the divergent bars 7 thereof. Bolts 18 passed through the aligned openings will maintain the bracket in rigid position, on the bar 7.

The outer extremity of the bracket is rounded as shown, providing what may be termed a circular plate portion 25, through the center of which an opening is made. The forward face of this plate is provided with radial teeth 26 adapted to interlock with similar teeth 27 on the plate portion 28 at the inner end of the block or head 29. The plate portion 28 of the head is provided with an opening through which a retaining bolt 30 is passed; it being understood that when the bolt is passed through the aligned openings of plates 25 and 28 and the head 29, and the nuts thereon tightened, the teeth 26 and 27 will be interlocked and the head or block 28 will be positively held against rotation upon the bracket. Should it be desired to vary the angularity of the block 28, it is but necessary to loosen the nuts upon the bolt 30, whereupon these adjustments may be easily and conveniently made.

Block 28 is provided with an opening 31 passing transversely through the block, and adapted to receive the shaft 32 which supports the circular cutter disk 33. A set screw 34 threaded into the block and into the opening 31 thereof will hold the shaft against longitudinal or rotary movement within the said opening.

Any preferred means may be employed for rotatably mounting the cultivator disk 33 upon its supporting shaft 32. However, in the present instance, the disk has a central aperture through which the shaft 32 extends, said shaft also passing through an elongated collar or sleeve 35 affixed to the rear face of the disk and constituting a bearing for the latter. The shaft is maintained against longitudinal movement by means of the pin 36 confined between the rear face of the outer disk 33 and within the socket 35' at the inner end of sleeve 35.

To assist the bracket and head in bearing the strain to which the blades must be subjected, stays 37 are provided. These stays may be constructed of rod iron provided at one end with eyes 38 to engage around the shaft, the opposite ends of the stays being threaded to receive clamping nuts 39. One of the stays is provided with a relatively small eye to encircle the reduced threaded end of the disk shaft 32, and jamb nuts 38 disposed one upon each side of the said eye will firmly hold the stay in proper position. The outer ends of the stays 37 pass through openings arranged respectively in the outer ends of the bracket 40 and in the frame bars 5 and 7 of the cultivator.

Mounted on the upper end of each of the channel members 10 is a rock segment 41, and pivotally carried by this segment is a lifting and lowering lever 42, said lever having an angularly extending foot 43, which is pivotally connected with the bar 11 by means of the link 44.

With the cultivator constructed in accordance with the foregoing, it is apparent that the cutting blades may be arranged in close relation or far apart as desired, and the angularity of these blades with respect to vertical as well as horizontal planes may be accurately governed. In providing the stays 37 for the opposing ends of the blade shafts, it is apparent that the strains will not alone be borne by the supporting bracket, but will be equally distributed as well to the said stays. The stays, furthermore, assist in maintaining the rigidity of the disks.

Also, the disks and shafts may be swung over to the opposite sides of the frame bars 5 and 7, as the case may require, as when employing the machine for shallow cultivation.

What is claimed is:

1. In a cultivator attachment, a bracket, a foot at one end of said bracket adapted to be secured to the frame of the cultivator, a block adjustably mounted at the outer end of said bracket, the said block having an opening therein, a cutter shaft extending through said opening and adjustable therein and means for holding the said shaft in adjusted positions.

2. In a cultivator attachment, a bracket, a foot at one end of said bracket adapted to be secured to the frame of the cultivator, a block adjustably mounted at the outer end of said bracket, the said block having an opening therein, a cutter shaft extending through said opening and adjustable therein, means for holding the said shaft in adjusted positions, and stays connecting said shaft to the cultivator frame.

3. In a cultivator attachment, a bracket, a block carried by the bracket and adjustable thereon, a shaft carried by the block, a cutter disk having an opening therein, one end of the shaft being reduced and threaded and extended through said opening, a sleeve on said disk enclosing a part of said shaft, a pin extending through said shaft between the cutter disk and the sleeve, and stays carried by said shaft.

4. In a device of the class described, a circular cutter, a shaft for said cutter, a bracket supporting said shaft in adjusted positions, stays for said shaft comprising bars having eyes at their ends to receive said shaft, arms for said stays, said arms having openings to receive the ends of said stays, adjusting nuts on said stays, and the opposite ends of said arms having spaced openings for the reception of bolts to adjustably support them upon a base.

In testimony whereof, I affix my signature in the presence of two witnesses.

WILLIAM W. WHITE.

Witnesses:
VIRGINIA L. SELLS,
JACK BUSS,